United States Patent
Park et al.

(10) Patent No.: US 7,821,935 B2
(45) Date of Patent: Oct. 26, 2010

(54) APPARATUS FOR AND METHOD OF MANAGING A ROUTING TABLE IN A MULTI-HOP SYSTEM

(75) Inventors: Yongsuk Park, Seoul (KR); Jin Woo Choe, Seoul (KR); Jong Ho Bang, Suwon-Si (KR); Bong Jhin Shin, Seoul (KR); Dong Kun Kim, Seoul (KR); Sung Hyuk Lee, Seoul (KR); Kil Su Hong, Busan (KR)

(73) Assignees: Samsung Electronics Co.,Ltd., Suwon-si (KR); Industry-University Cooperation Foundation Sogang University, Seoul (KR)

( * ) Notice: Subject to any disclaimer, the term of this patent is extended or adjusted under 35 U.S.C. 154(b) by 405 days.

(21) Appl. No.: 11/882,513

(22) Filed: Aug. 2, 2007

(65) Prior Publication Data

US 2008/0056126 A1 Mar. 6, 2008

(30) Foreign Application Priority Data

Sep. 4, 2006 (KR) .................. 10-2006-0084717

(51) Int. Cl.
*H04L 12/26* (2006.01)
*G06F 15/173* (2006.01)

(52) U.S. Cl. .................. 370/230.1; 370/252; 709/223
(58) Field of Classification Search .................. None
See application file for complete search history.

(56) References Cited

U.S. PATENT DOCUMENTS

| | | | |
|---|---|---|---|
| 2003/0128687 A1* | 7/2003 | Worfolk et al. | 370/351 |
| 2004/0264372 A1 | 12/2004 | Huang | |
| 2005/0129000 A1 | 6/2005 | Sivakumar | |
| 2005/0208949 A1* | 9/2005 | Chiueh | 455/452.2 |
| 2005/0249148 A1* | 11/2005 | Nakamata et al. | 370/328 |
| 2006/0199595 A1* | 9/2006 | Halonen | 455/453 |
| 2006/0230150 A1* | 10/2006 | Roy | 709/226 |
| 2009/0185491 A1* | 7/2009 | Schollmeier et al. | 370/238 |
| 2009/0213849 A1* | 8/2009 | Sachs et al. | 370/389 |

FOREIGN PATENT DOCUMENTS

| | | |
|---|---|---|
| EP | 1 571 789 A1 | 9/2005 |
| EP | 1 376 939 A3 | 7/2006 |
| JP | 2003-219472 | 7/2003 |
| KR | 10-2002-0047758 A | 6/2002 |
| KR | 10-2002-0096753 A | 12/2002 |
| KR | 10-2004-0014551 | 2/2004 |
| KR | 10-2004-0095190 A | 11/2004 |
| KR | 10-2005-0091781 | 9/2005 |
| KR | 10-2006-0019944 A | 3/2006 |

* cited by examiner

*Primary Examiner*—Pankaj Kumar
*Assistant Examiner*—Marcus R Smith
(74) *Attorney, Agent, or Firm*—NSIP Law (57) ABSTRACT

A method of managing a routing table by interoperating with a routing block and a radio resource management (RRM)/scheduling block in a plurality of nodes of a multi-hop system, the method including computing a traffic load rate of each path which transmits traffic and updating the routing table with the computed traffic load rate via the routing block; and updating a plurality of metrics included in the routing table based on the traffic load rate and information transmitted from a neighbor node via the RRM/scheduling block.

15 Claims, 8 Drawing Sheets

APPARATUS FOR AND METHOD OF MANAGING A ROUTING TABLE IN A MULTI-HOP SYSTEM

CROSS-REFERENCE TO RELATED APPLICATIONS

This application claims the benefit under 35 U.S.C. §119(a) of Korean Patent Application No. 10-2006-0084717, filed on Sep. 4, 2006, in the Korean Intellectual Property Office, the entire disclosure of which is hereby incorporated by reference.

BACKGROUND OF THE INVENTION

1. Field of the Invention

The present invention relates to a wireless multi-hop system. More particularly, the present invention relates to an apparatus for and a method of managing a routing table in a multi-hop system to effectively increase resource efficiency.

2. Description of Related Art

The increasing demand for data transmission using wireless communication systems has resulted in a great deal of research into improving the efficiency of such systems. Particularly, the following areas have been extensively researched: systems using multi-channel schemes such as multiple-input multiple-output (MIMO) and orthogonal frequency division multiple access (OFDMA) for obtaining diversity gain, and multi-hop systems for increasing resource efficiency by reducing electromagnetic wave loss.

For such systems, research focuses on routing methods for wireless multi-hop environments as well as radio resource management (RRM) methods. The RRM methods increase the diversity gain of multi-channel systems and greatly enhance system performance.

Those methods include three phase parallel scheduling/RRM, cross-layer routing-scheduling, destination sequenced distance vector-multi channel (DSDV-MC), multi-path distance vector algorithm (MDVA), and interference-aware routing.

However, multi-hop systems according to the conventional art apply RRM/scheduling to links comprising only single hops. Also, the multi-hop systems according to the conventional art do not reflect changes in resource efficiency depending on channel allocation for a particular routing. Accordingly, wireless resources may not be used as efficiency as feasible.

Accordingly, there is a need for multi-hop systems and methods which apply RRM/scheduling to links comprising multi hops and reflect changes in resource efficiency depending on channel allocation.

SUMMARY OF THE INVENTION

Exemplary embodiments of the present invention address at least the above problems and/or disadvantages and provide at least the advantages described below. Accordingly, an aspect of exemplary embodiments of the present invention is to provide an apparatus for and a method of managing a routing table which adjust to an amount of resources depending on a path allocation on the routing table by interoperating with a routing and a radio resource management (RRM)/scheduling in a plurality of nodes of a multi-hop system, thereby increasing resource efficiency.

According to an aspect of the present invention, there is provided a method of managing a routing table by interoperating with a routing block and an RRM/scheduling block in a plurality of nodes of a multi-hop system. The method includes computing a traffic load rate of each path which transmits traffic and updating the routing table with the computed traffic load rate via the routing block. A plurality of metrics included in the routing table are updated based on the traffic load rate and information transmitted from a neighbor node via the RRM/scheduling block.

According to an aspect of the present invention, there is provided an apparatus for managing a routing table in a multi-hop system which interoperates with a routing and an RRM/scheduling in a plurality of nodes. The apparatus comprises a routing block for periodically computing a traffic load rate of each path which transmits traffic and for updating the routing table with the computed traffic load rate. An RRM/scheduling block updates a plurality of metrics included in the routing table based on the traffic load rate and information transmitted from a neighbor node.

Other objects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other objects, features, and advantages of certain exemplary embodiments of the present invention will be more apparent from the following detailed description, taken in conjunction with the accompanying drawings in which.

Throughout the drawings, the same drawing reference numerals will be understood to refer to the same elements, features, and structures.

DETAILED DESCRIPTION OF EXEMPLARY EMBODIMENTS

The matters defined in the description such as a detailed construction and elements are provided to assist in a comprehensive understanding of the embodiments of the invention. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

A mobile station (MS) as used throughout the present specification includes mobile communication devices, a public switched telephone network (PSTN) terminal, a voice over Internet Protocol (VoIP) device, a session initiation protocol (SIP) device, a media gateway control (Megaco) device, a personal digital assistant (PDA), a mobile phone, a personal communication service (PCS) phone, a hand-held PC, a Code Division Multiple Access (CDMA)-2000 (1X, 3X) phone, a Wideband CDMA phone, a dual band/dual mode phone, a Global System for Mobile Communications (GSM) phone, a mobile broadband system (MBS) phone, a satellite/terrestrial Digital Multimedia Broadcasting (DMB) phone, and the like.

Figure 1:
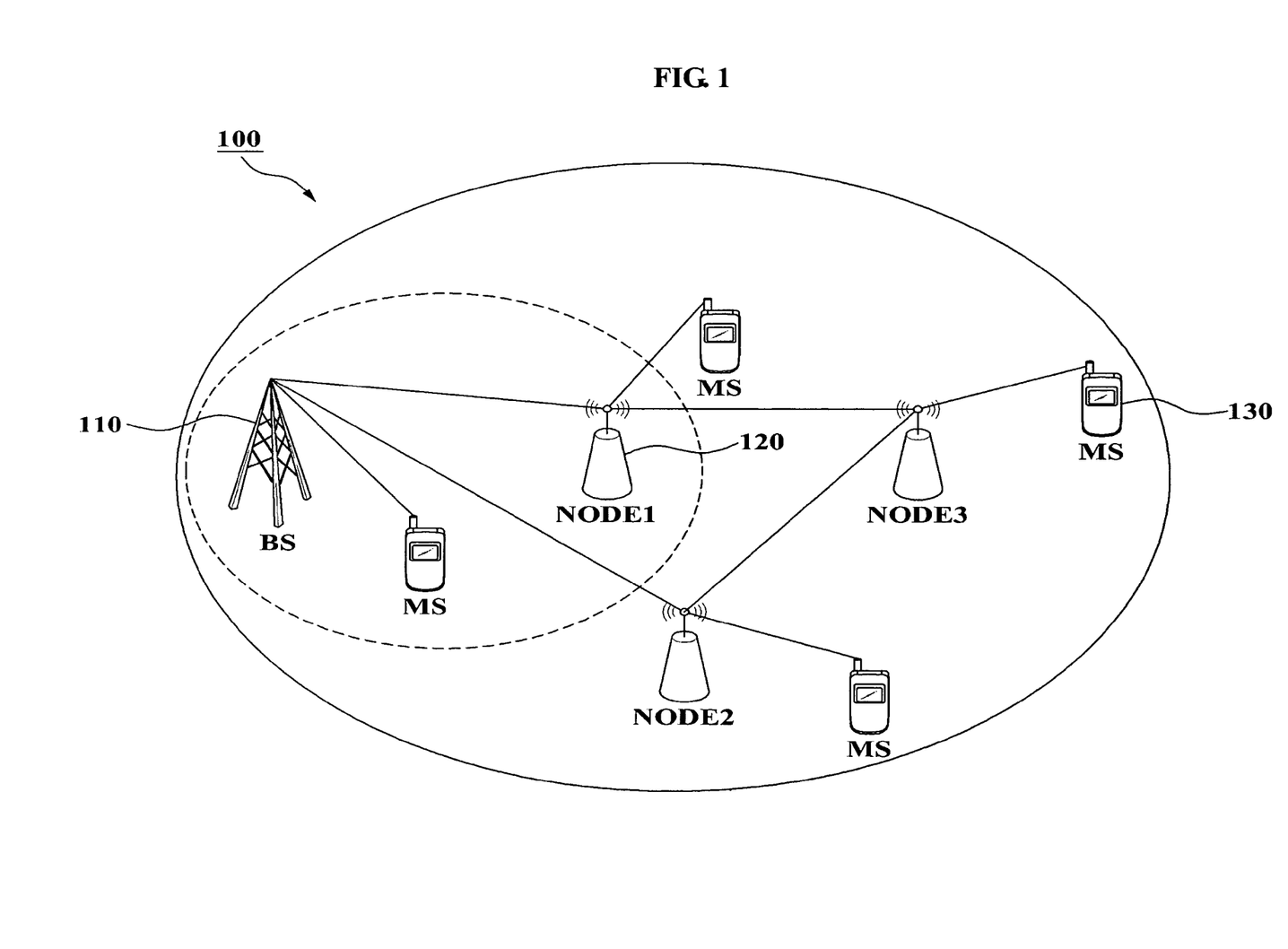
FIG. 1 is a diagram illustrating a multi-hop system according to an exemplary embodiment of the present invention.

FIG. 1 is a diagram illustrating a multi-hop system 100 according to an exemplary embodiment of the present invention.

As shown in FIG. 1, the multi-hop system 100 according to an exemplary embodiment of the present invention includes a base station BS 110, a plurality of nodes 120, and a mobile station MS 130. In this embodiment, the plurality of nodes 120 corresponds to multi-hop stations or relay stations. The multi-hop system 100 may transmit traffic via a multi-hop or a multi-channel from the BS 110 to the MS 130. Accordingly, the multi-hop system 100 may have a relatively wider range of service than the current range of service.

The plurality of nodes 120 includes a plurality of multi-hops between the BS 110 and the MS 130. The plurality of nodes 120 may reduce dead zones through the plurality of multi-hops, improve transfer rate, and increase the range of service.

An operational principle of a multi-hop system described above according to an exemplary embodiment of the present invention is described in detail with reference to FIG. 2.

Figure 2:
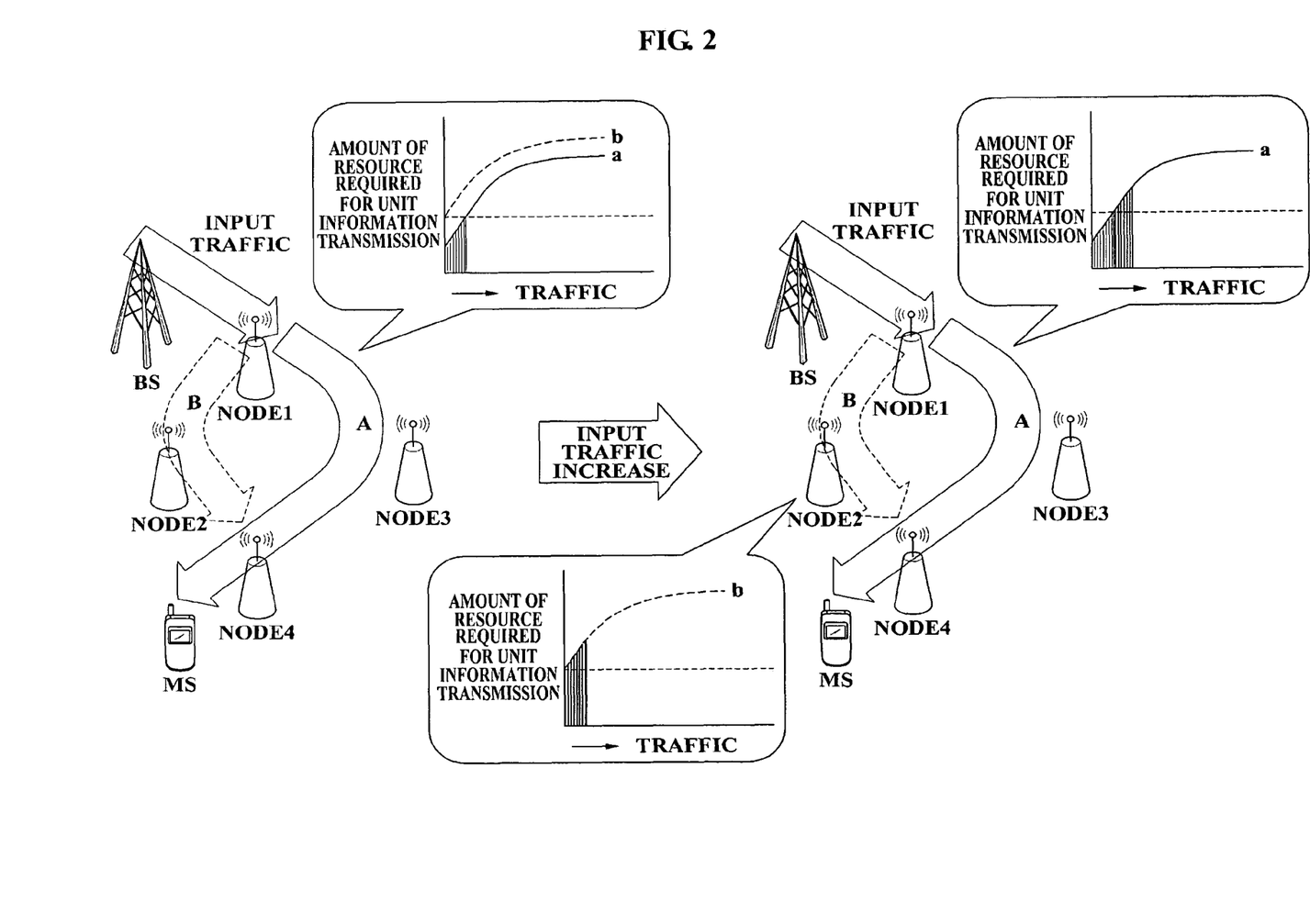
FIG. 2 is a diagram illustrating an example of an operational principle of a multi-hop system according to an exemplary embodiment of the present invention.

FIG. 2 is a diagram illustrating an example of an operational principle of a multi-hop system according to an exemplary embodiment of the present invention.

In a multi-hop system according to an exemplary embodiment of the present invention, for example, when transmitting traffic via a path A, an amount of resources required to transmit the traffic increases along a curve a as the traffic increases as shown in a graph of FIG. 2. Also, when transmitting the traffic via a path B, the amount of resources required to transmit the traffic increases along a curve b as the traffic increases as shown in the graph of FIG. 2. In this instance, the amount of resources required to transmit the traffic via the path A is comparatively less than the amount of resources required to transmit the traffic via the path B. Accordingly, a BS transmits the traffic to a MS via the path A.

Then, when the transmitted traffic increases such that the amount of resources required to transmit the traffic via the path A is as much as the amount of resources required to transmit the traffic via the path B, the BS interoperates with a routing and a radio resource management (RRM)/scheduling to thereby distribute the input traffic via the path A and path B. Accordingly, the BS transmits the input traffic to the MS.

A plurality of nodes comprising a multi-hop system according to an exemplary embodiment of the present invention is described in detail with reference to FIG. 3.

Figure 3:
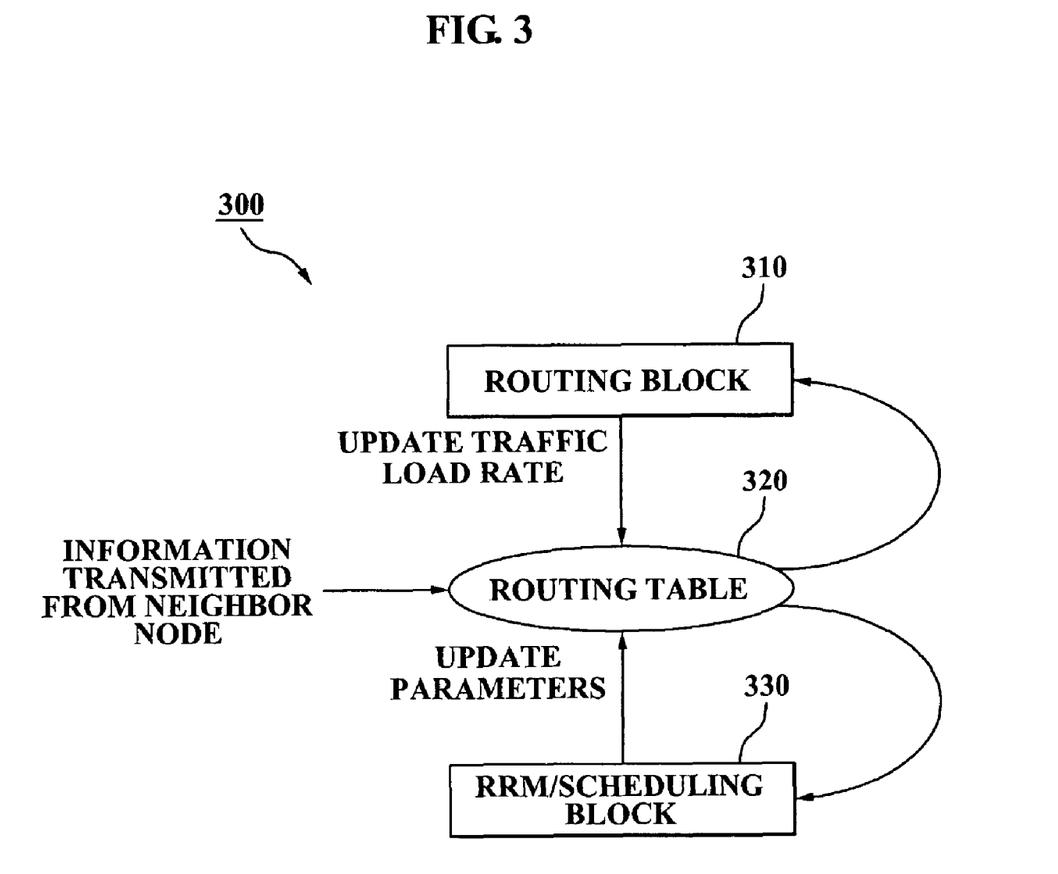
FIG. 3 is a block diagram illustrating a node comprising a multi-hop system according to an exemplary embodiment of the present invention.

FIG. 3 is a block diagram illustrating a node 300 comprising a multi-hop system according to an exemplary embodiment of the present invention. In this embodiment, the node 300 may be any one of a base station, a multi-hop station, a relay station, and a mobile station.

As shown in FIG. 3, the node 300 comprising the multi-hop system according to an exemplary embodiment of the present invention includes a routing block 310, an RRM/scheduling block 330, and a routing table 320.

The routing block 310 computes a traffic load rate of each path which transmits periodically transmitted traffic, and the traffic load rate is allocated for each of the paths. Also, the routing table 320 is updated with the computed traffic load rate by the routing block 310.

The RRM/scheduling block 330 computes parameters included in the routing table 320 based on the computed traffic load rate and information. In this embodiment, the information is transmitted from a neighbor node. Also, the parameters of the routing table 320 are updated by the RRM/scheduling block 330.

A method of managing a routing table in a multi-hop system according to an exemplary embodiment of the present invention is described in detail with reference to FIG. 4.

Figure 4:
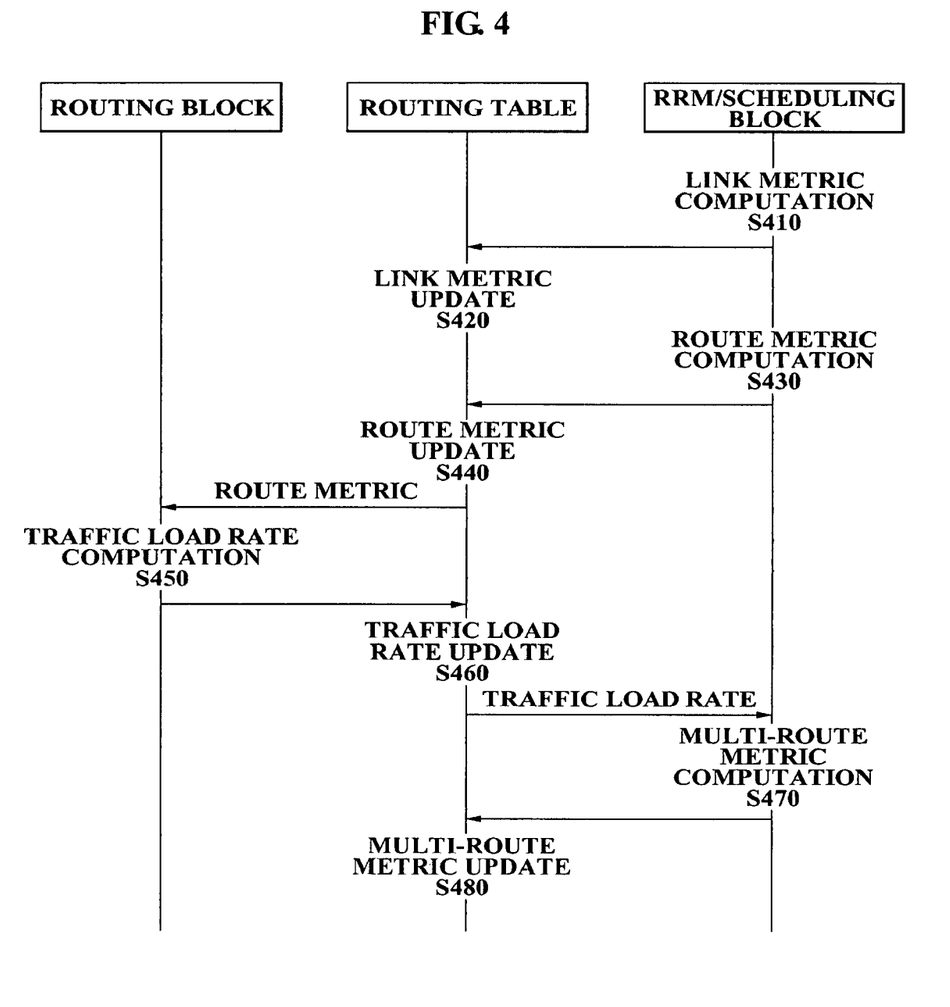
FIG. 4 is a flowchart illustrating a method of managing a routing table in a multi-hop system according to an exemplary embodiment of the present invention.

FIG. 4 is a flowchart illustrating a method of managing a routing table in a multi-hop system according to an exemplary embodiment of the present invention.

As shown in FIG. 4, the method of managing a routing table in a multi-hop system according to an exemplary embodiment of the present invention comprises the following operations. In operation S410, a link metric is computed. In operation S420, the routing table is updated with the computed link metric. In operation S430, a route metric is computed. In operation S440, the routing table is updated with the computed route metric. In operation S450, a traffic load rate is computed. In operation S460, the routing table is updated with the computed traffic load rate. In operation S470, a multi-route metric is computed. In operation S480, the computed multi-route metric is updated to the routing table. Also, the above described operations may be performed independently or in another order depending on each node.

The method of managing a routing table in a multi-hop system according to an exemplary embodiment of the present invention is described in greater detail below.

The routing table may include a plurality of parameters, and the parameters may include a target node, the multi-route metric, the link metric, the route metric, the traffic load rate, and information, which are described in detail with reference to FIG. 5. In this embodiment, the information is transmitted from a neighbor node, and may include a multi-route metric of the neighbor node.

Figure 5:
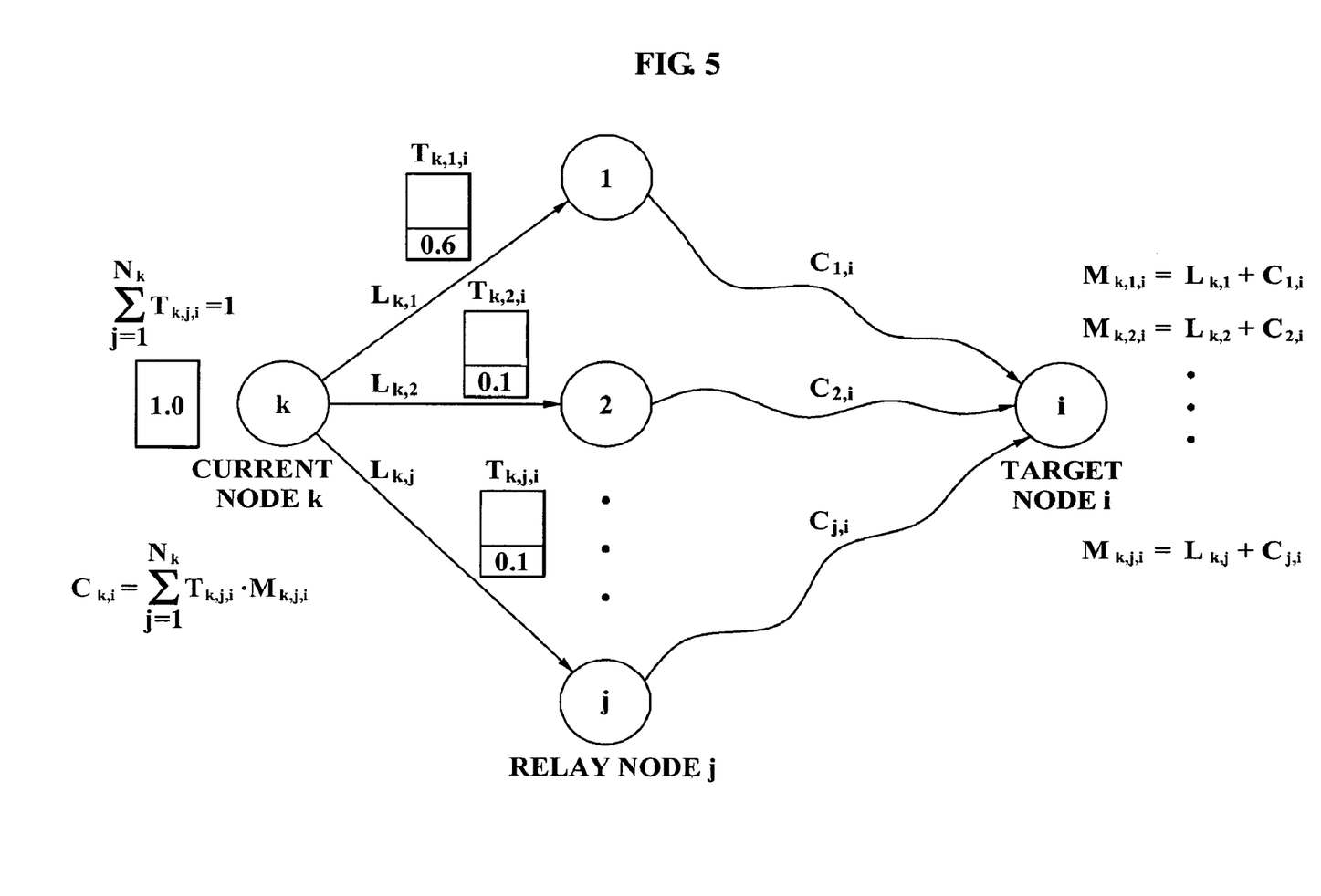
FIG. 5 is a diagram illustrating relationships of a plurality of parameters according to an exemplary embodiment of the present invention.

FIG. 5 is a diagram illustrating relationships of a plurality of parameters according to an exemplary embodiment of the present invention.

As shown in FIG. 5, the plurality of parameters according to an exemplary embodiment of the present invention includes a target node, a multi-route metric, a link metric, a route metric, a traffic load rate, and information which is transmitted from a neighbor node. In FIG. 5, k designates a current node, j designates a plurality of relay nodes which provide a multi-hop communication, and i designates a target node. Also, L designates the link metric, M, C designates the multi-route metric, and T designates the traffic load rate. In this embodiment, the metrics correspond to an amount of resources required for a traffic transmission, and specifically refer to an average amount of resources used with respect to unit information. For example, when the resource is a number of channels with respect to a path for the traffic transmission, a unit of the metrics may be the number of channels/bit.

A method of computing the plurality of parameters defined above is described in detail below.

The RRM/scheduling block 330 may update the parameters included in the routing table 320 based on the traffic load rate and the information. In this embodiment, the traffic load rate is stored in the routing table 320, and the information is transmitted from the neighbor node, i.e. the multi-route metric which is computed in the neighbor node. The parameters may be computed by equations detailed below.

The RRM/scheduling block 330 computes the link metric based on the updated traffic load rate in operation S410. Also, the computed link metric of the routing table 320 is updated by the RRM/scheduling block 330 in operation S420. In this embodiment, the link metric is determined by, $$L_{k,j} = f\left(\overset{\omega}{T_k}, \overset{\omega}{\Gamma_k}\right) \quad \text{[Equation 1]}$$

$$\overset{\omega}{T_k} = \begin{pmatrix} \sum_{i=1}^{NT-1} T_{k,1,i} \cdot D_{k,1,i}, \\ \sum_{i=1}^{NT-1} T_{k,2,i} \cdot D_{k,2,i}, \dots, \\ \sum_{i=1}^{NT-1} T_{k,N_k,i} \cdot D_{k,N_k,i} \end{pmatrix}$$

$$\overset{\omega}{\Gamma_k} = (\Gamma_{k,1}, \Gamma_{k,2}, \dots, \Gamma_{k,N_k})$$

Here, $L_{k,j}$ designates the link metric from the current node k to the relay nodes j, and $\overset{\omega}{T_k}$ designates a vector indicating a total amount of traffic which is transmitted from the current node k via the relay nodes j. Also, $\overset{\omega}{\Gamma_k}$ designates a vector indicating a status of a wireless channel connecting the current node k and the relay nodes j. For example, when a status of a channel is represented by a signal to interference and noise ratio (SINR), a unit of the status of the channel may be in decibels (dB). $T_{k,j,i}$ designates the traffic load rate from the current node k to the target node i via the relay nodes j. $D_{k,j,i}$ designates an amount of traffic from the current node k to the target node i via the relay nodes j. $N_k$ designates a number of the relay nodes j connected with the current node k. NT designates a total number of nodes which can be the target node i, i.e. the total number of nodes comprising a multi-hop system. As described above, a function f which has the traffic load rate $T_{k,j,i}$ as a parameter may take into account the traffic load rate $T_{k,j,i}$, the total traffic to be transmitted to the target node, and the status of the wireless channel. It should be noted that the function f cannot be obtained in a closed form for most practical multi-hop systems, and it is simply used to show that $L_{k,j}$ depends on $\overset{\omega}{T_k}$ and $\overset{\omega}{\Gamma_k}$. In practice, that the actual value of $L_{k,j}$ can be computed by the RRM/scheduling block during its normal operations.

For example, the RRM/scheduling block 330 simultaneously performs an RRM and a scheduling with the traffic load rate $T_{k,j,i}$ with respect to each link. As a result of performing the RRM and the scheduling, a resource efficiency with respect to an amount of resources, such as a cost, is reflected, and the link metric is computed.

The RRM/scheduling block 330 computes the route metric $M_{k,j,i}$ based on the updated link metric $L_{k,j}$ and the multi-route metric $C_{j,i}$ which is transmitted from the neighbor node in operation S430. Also, the computed route metric $M_{k,j,i}$ of the routing table 320 is updated by the RRM/scheduling block 330 in operation S440. In this embodiment, the route metric $M_{k,j,i}$ is determined by,

[Equation 2]

$$M_{k,j,i} = C_{j,i} + L_{k,j}$$

Here, $C_{j,i}$ designates the multi-route metric from the relay nodes j to the target node i, and is transmitted from the neighbor node, i.e. the relay nodes j. $M_{k,j,i}$ designates the route metric from the current node k to the target node i via the relay nodes j, and may be computed by adding the multi-route metric $C_{j,i}$ and the link metric $L_{k,j}$.

In this embodiment, the routing block 310 computes the traffic load rate $T_{k,j,i}$ of each path which periodically transmits the traffic based on the computed route metric $M_{k,j,i}$ in operation S450. Also, the routing block 310 updates the computed traffic load rate $T_{k,j,i}$ to the routing table 320 in operation S460. That is, the routing block 310 decreases the traffic load rate $T_{k,j,i}$ when an amount of resources required for each of the paths increases, and increases the traffic load rate $T_{k,j,i}$ when the amount of resources required for the each of the paths decreases.

The routing block 310 increases the traffic load rate $T_{k,j,i}$ of a path which has relatively higher resource efficiency from among the plurality of paths transmitting the traffic. Also, the routing block 310 may allocate traffic of the increased traffic load rate $T_{k,j,i}$ to the path having relatively higher resource efficiency.

The RRM/scheduling block 330 computes the multi-route metric $C_{k,i}$ based on the updated route metric $M_{k,j,i}$ and the updated traffic load rate $T_{k,j,i}$ in operation S470. Also, the RRM/scheduling block 330 updates the computed multi-route metric $C_{k,i}$ to the routing table 320 in operation S480. In this embodiment, the multi-route metric $C_{k,i}$ is determined by, $$C_{k,i} = \sum_{j=1}^{N_k} T_{k,j,i} \cdot M_{k,j,i} \quad \text{[Equation 3]}$$

Here, $C_{k,i}$ designates the multi-route metric from the current node k to the target node i, and may be computed by a sum of values which are acquired by multiplying the route metric $M_{k,j,i}$ and the traffic load rate $T_{k,j,i}$.

The plurality of metrics described above is updated to the routing table 320 as shown in Table 1.

TABLE 1

| Target node | Multi-route metric | 1 | | | | ... | j | | | |
|---|---|---|---|---|---|---|---|---|---|---|
| 1 | $C_{k,1}$ | $T_{k,1,1}$ | $M_{k,1,1}$ | $L_{k,1}$ | $C_{1,1}$ | ... | $T_{k,j,1}$ | $M_{k,j,1}$ | $L_{k,j}$ | $C_{j,1}$ |
| 2 | $C_{k,2}$ | $T_{k,1,2}$ | $M_{k,1,2}$ | $L_{k,2}$ | $C_{1,2}$ | ... | $T_{k,j,2}$ | $M_{k,j,2}$ | $L_{k,j}$ | $C_{j,2}$ |
| i | $C_{k,i}$ | $T_{k,1,i}$ | $M_{k,1,i}$ | $L_{k,i}$ | $C_{1,i}$ | ... | $T_{k,j,i}$ | $M_{k,j,i}$ | $L_{k,j}$ | $C_{j,i}$ |

As shown in Table 1, the plurality of parameters from the current node k to the target node i via the relay nodes j for each target node with respect to the relay nodes 1 through j are included. In this embodiment, the plurality of parameters includes $C_{k,i}$, $T_{k,j,i}$, $M_{k,j,i}$, $L_{k,j}$, and $C_{j,i}$. $C_{j,i}$ designates information transmitted from the relay nodes j. The current node k transmits the multi-route metric $C_{k,i}$ for each of the target nodes i from the routing table 320 to at least one neighbor node. The routing table 320 described above is not limited to the described embodiment, and may vary.

Concepts of the multi-route metric $C_{k,i}$, the route metric $M_{k,j,i}$, and the link metric $L_{k,j}$ are described in detail with reference to FIG. 6.

Figure 6:
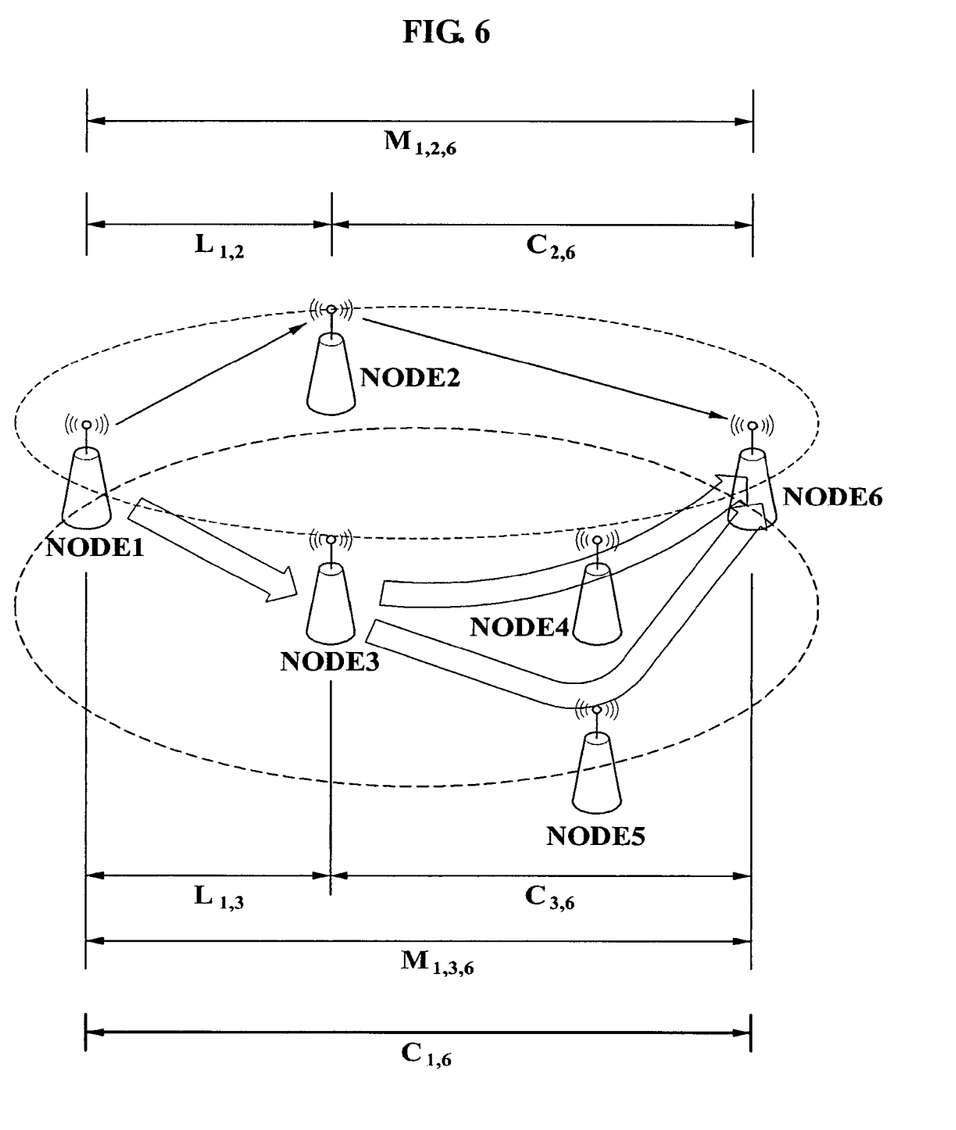
FIG. 6 is a diagram illustrating an example of concepts of a plurality of metrics according to an exemplary embodiment of the present invention.

FIG. 6 is a diagram illustrating an example of concepts of a plurality of metrics according to an exemplary embodiment of the present invention.

As shown in FIG. 6, the link metric is an amount of resources required for a link from among the plurality of metrics according to an exemplary embodiment of the present invention. In this embodiment, the link comprises a single hop between nodes. For example, a link metric $L_{1,2}$ designates a metric between a current node 1 and a target node 2. The link metric $L_{1,2}$ is computed by a function which considers total traffic and a status of a wireless channel as a parameter, similar to Equation 1. In this embodiment, the traffic is transmitted via a relay node 2, i.e. the target node 2, and the wireless channel connects the relay node 2 and the current node 1.

Similarly, a link metric $L_{1,3}$ designates a metric between the current node 1 and a target node 3. The link metric $L_{1,3}$ is computed by a function which considers total traffic and a status of a wireless channel as the parameter, similar to Equation 1. In this embodiment, the traffic is transmitted via a relay node 3, i.e. the target node 3, and the wireless channel connects the relay node 3 and the current node 1.

The route metric is an average amount of resources used when the traffic is transferred via a route. In this embodiment, the route comprises a single hop or multi-hops between the nodes, i.e. the route comprises one certain neighbor node to the target node. For example, a route metric $M_{1,2,6}$ designates a metric among the current node 1, the relay node 2 and a target node 6. The route metric $M_{1,2,6}$ is computed by a sum of the link metric $L_{1,2}$ and a multi-route metric $C_{2,6}$, similar to Equation 2.

Similarly, a route metric $M_{1,3,6}$ designates a metric among the current node 1, the relay node 3 and the target node 6. The route metric $M_{1,3,6}$ is computed by a sum of the link metric $L_{1,3}$ and a multi-route metric $C_{3,6}$, similar to Equation 2.

The multi-route metric is an average amount of resources used when the traffic is transferred via a multi-route. In this embodiment, the multi-route comprises a single hop or multi-hops between the nodes, i.e. the multi-route comprises a plurality of multi-hops to the target node. For example, a multi-route metric $C_{1,6}$ is a metric between the current node 1 and the target node 6. The multi-route metric $C_{1,6}$ is computed by a sum of values. In this embodiment, the values are acquired by multiplying a traffic load rate $T_{1,2,6}$ and the route metric $M_{1,2,6}$, and a traffic load rate $T_{1,3,6}$ and the route metric $M_{1,3,6}$, similar to Equation 3. Also, the traffic load rates $T_{1,2,6}$ and $T_{1,3,6}$ are a traffic load rate for each path via the relay nodes 2 and 3.

According to an exemplary embodiment of the present invention, a routing and an RRM/scheduling are interoperated by taking into account a change of a resource efficiency in the plurality of nodes. Thus, network congestion may be reduced, resource efficiency of the network may increase, and the network may be stabilized.

The plurality of nodes are required to update the routing table with each of the target nodes, and share the updated routing table with a plurality of neighbor nodes. For this, a method has been proposed that a routing table including only the multi-route metric for each of the target nodes, not all routing tables, is transmitted to the plurality of neighbor nodes. Thus, according to this method, overhead for routing table transfer due to an increase in size of the routing table may be reduced. For example, in Table 1, the multi-route metric $C_{1,6}$ for each of the target nodes 1 though j may be transmitted to at least one neighbor node.

As described above, according to an exemplary embodiment of the present invention, the routing and the RRM/scheduling are interoperated by taking into account the change of the resource efficiency in the plurality of nodes. Thus, a control function which is required to be provided by a base station may be distributed, and the control function of the base station may be reduced.

Also, according to an exemplary embodiment of the present invention, when adding or removing at least one other node to or from the neighbor node, the apparatus for and method of managing a routing table may be utilized, as described in detail with reference to FIGS. 7 and 8.

Figure 7:
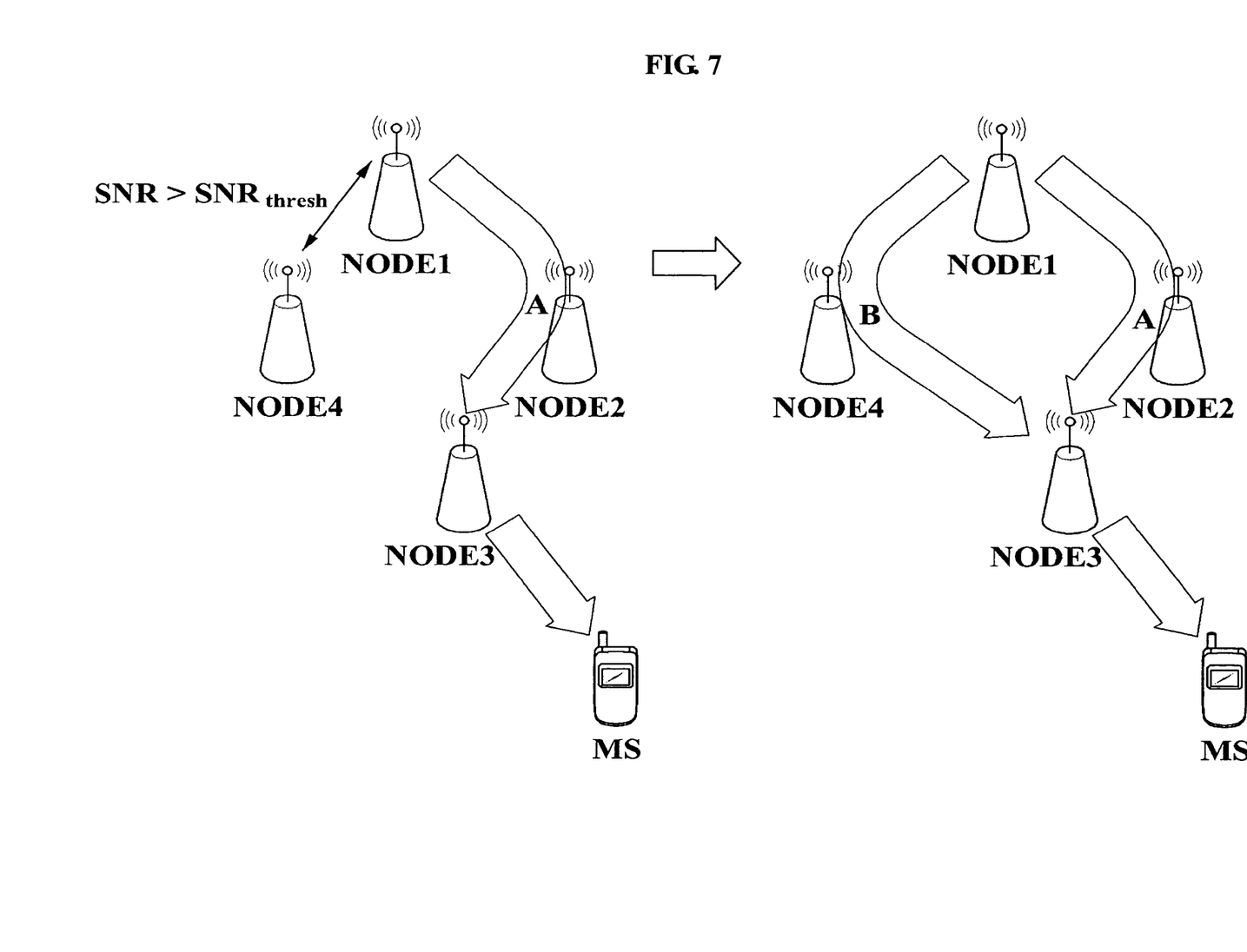
FIG. 7 is a diagram illustrating a process of adding another node according to an exemplary embodiment of the present invention.

FIG. 7 is a diagram illustrating a process of adding another node according to an exemplary embodiment of the present invention.

As shown in FIG. 7, a multi-hop system according to an exemplary embodiment of the present invention may transmit traffic via a path A to a mobile station MS. In this embodiment, the path A is from a current node 1 to a target node 3 via a relay node 2. The RRM/scheduling block 330 may add a node 4 included in another path B, when an amount of resources required for the path A increases and at least one parameter of the plurality of parameters, i.e. $C_{k,i}$, $M_{k,j,i}$, and $L_{k,j}$ increases to be over a predetermined level. For example, when the node 4 having a signal-to-noise ratio (SNR) which is greater than a predetermined threshold exists, the RRM/scheduling block 330 may add the node 4 to a neighbor node. Also, when a resource efficiency of path B including the node 4 is greater than a resource efficiency of path A, a portion of the traffic which is transmitted via path A may be transmitted via path B.

Accordingly, the traffic may be transmitted to the MS via the two paths, i.e. path A and path B. Specifically, path A is from the current node 1 to the target node 3 via the relay node 2, and path B is from the current node 1 to the target node 3 via another node.

Figure 8:
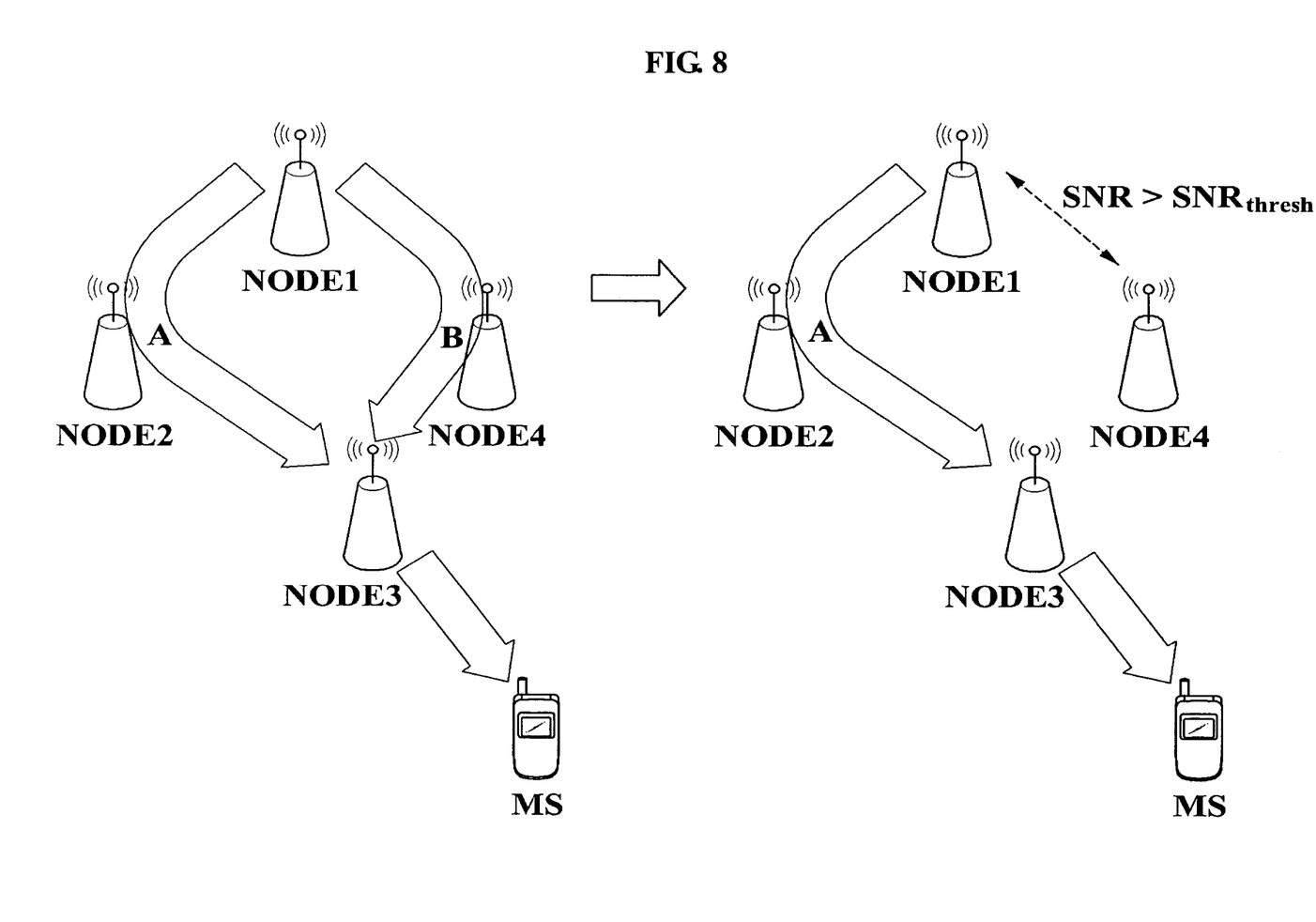
FIG. 8 is a diagram illustrating a process of removing a single node according to an exemplary embodiment of the present invention.

FIG. 8 is a diagram illustrating a process of removing a single node according to an exemplary embodiment of the present invention.

As shown in FIG. 8, a multi-hop system according to an exemplary embodiment of the present invention may transmit traffic to a mobile station MS via a path A and a path B. In this instance, tpath A is from a current node 1 to a target node 3 via a relay node 2, and path B is from the current node 1 to the target node 3 via a relay node 4. The RRM/scheduling block 330 may remove the node 4 that forms path B when an amount of resources required for path B increases and at least one parameter of the plurality of parameters, i.e. $C_{k,i}$, $M_{k,j,i}$, and $L_{k,j}$ increases over a predetermined level. For example, when a SNR of the node 4 from among neighbor nodes is less than a predetermined threshold due to a situation change of the network, a resource efficiency of a route including the node 4 decreases, and a traffic load rate becomes '0'. Accordingly, the RRM/scheduling block 330 may remove the node 4.

Thus, the traffic may be transmitted to the MS via the path A, i.e. from the current node 1 to the target node 3 via the relay node 2, by interoperating with the routing and the RRM/scheduling.

The multi-hop system according to exemplary embodiments of the present invention may be used in a wireless communication system. Also, the multi-hop system according to exemplary embodiments of the present invention may be used in a wired communication system and a communication system combining the wireless communication system with the wired communication system regardless of the routing and the RRM/scheduling which are operated for each hop or node.

The exemplary embodiments of the present invention may be recorded in computer-readable media including program instructions to implement various operations embodied by a computer. The media may also include, alone or in combination with the program instructions, data files, data structures, and the like. The media and program instructions may be those specially designed and constructed for the purposes of the present invention, or they may be of the kind well-known and available to those having skill in the computer software arts. Examples of computer-readable media include magnetic media such as hard disks, floppy disks, and magnetic tape; optical media such as CD ROM disks and DVD; magneto-optical media such as optical disks; and hardware devices that are specially configured to store and perform program instructions, such as read-only memory (ROM), random access memory (RAM), flash memory, and the like. The media may also be a transmission medium such as optical or metallic lines, wave guides, etc. including a carrier wave transmitting signals specifying the program instructions, data structures, etc. Examples of program instructions include both machine code, such as produced by a compiler, and files containing higher level code that may be executed by the computer using an interpreter. The described hardware devices may be configured to act as a combination of hardware and software modules in order to perform the operations of the above-described embodiments of the present invention.

According to an aspect of exemplary embodiments of the present invention, an apparatus for and a method of managing a routing table adjusts an amount of resources depending on a path allocation to the routing table by interoperating with a routing and a radio resource management (RRM)/scheduling in a plurality of nodes of a multi-hop system, thereby increasing resource efficiency.

While certain exemplary embodiments of the invention have been shown and described with reference to certain preferred embodiments thereof, it will be understood by those skilled in the art that various changes in form and details may be made therein without departing from the spirit and scope of the invention as defined by the appended claims and their equivalents.

What is claimed is:

1. A method of an apparatus for managing a routing table, the method comprising:

determining, by the apparatus, a route metric of a plurality of routing paths from a current node to a target node through a plurality of relay nodes, the route metric being an average amount of resources used for the plurality of routing paths from the current node to the target node;

determining, by the apparatus, a traffic load rate, based on the routing metric, for the plurality of routing paths from the current node to the target node;

receiving, by the apparatus, a multi-route metric from a relay node, the multi-route metric being an average amount of resources used for the plurality of routing paths from the relay node to the target node;

determining, by the apparatus, a link metric with regard to a link between the current node and the relay node, the link metric being an amount of resources used for the link;

updating, by the apparatus, a plurality of metrics included in the routing table based on the traffic load rate; and updating, by the apparatus, the routing table with the link metric with regard to the link between the current node and the relay node, the route metric with regard to the current node, the relay node, and the target node, and the multi-route metric received from the relay node.

2. The method of claim 1, wherein the route metric is determined based on the multi-route metric.

3. The method of claim 1, wherein the link metric is determined by a total traffic on the link and a status of a wireless channel connecting the current node and the relay node.

4. The method of claim 1, wherein the route metric with regard to the current node, the relay node, and the target node is determined by the link metric and the multi-route metric received from the relay node.

5. The method of claim 1, wherein the multi-route metric is determined by a second route metric with regard to the relay node, a second relay node, and the target node, and a second traffic load rate with regard to a routing path from the relay node to the target node through the second relay node, the second metric being an average amount of resources used for a plurality of routing paths from the relay node to the target node through the second relay node.

6. A non-transitory computer-readable storage medium having stored therein instructions for causing a processor to execute a method for managing a routing table, the method comprising:

determining a route metric of a plurality of routing paths from a current node to a target node through a plurality of relay nodes, the route metric being an average amount of resources used for the plurality of routing paths from the current node to the target node;

determining a traffic load rate, based on the routing metric, for the plurality of routing paths from the current node to the target node, and to update the routing table with the traffic load rate;

receiving, by the apparatus, a multi-route metric from a relay node, the multi-route metric being an average amount of resources used for the plurality of routing paths from the relay node to the target node;

determining a link metric with regard to a link between the current node and the relay node, the link metric being an amount of resources used for the link;

updating a plurality of metrics included in the routing table based on the traffic load rate; and updating the routing table with the link metric with regard to the link between the current node and the relay node, the route metric with regard to the current node, the relay node, and the target node, and the multi-route metric received from the relay node.

7. An apparatus for managing a routing table in a plurality of nodes, the apparatus comprising:

an RRM/scheduling block for determining a route metric of a plurality of routing paths from a current node to a target node through a plurality of relay nodes, and for receiving a multi-route metric from a relay node, and for determining a link metric with regard to a link between the current node and the relay node, the route metric being an average amount of resources used for the plurality of routing paths from the current node to the target node, and the link metric being an amount of resources used for the link; and a routing block for periodically computing a traffic load rate, based on the routing metric, for the plurality of routing paths from the current node to the target node, and for updating the routing table with the computed traffic load rate, wherein the RRM/scheduling block updates a plurality of metrics included in the routing table based on the traffic load rate, and updates the routing table with the link metric with regard to the link between the current node and the relay node, the route metric with regard to the current node, the relay node, and the target node, and the multi-route metric received from the relay node.

8. The apparatus of claim 7, wherein the multi-route metric is an average amount of resources used for a plurality of routing paths from the relay node to the target node, and the route metric with regard to the current node, the relay node, and the target node is generated using the multi-route metric.

9. The apparatus of claim 7, wherein the traffic load rate decreases when an amount of resources used for a routing path increases, and increases when the amount of resources used for the routing path decreases.

10. The apparatus of claim 7, wherein the link is determined by a total traffic on the link and a status of a wireless channel connecting the current node and the relay node.

11. The apparatus of claim 7, wherein the route metric with regard to the current node, the relay node, and the target node, is determined by the link metric and the multi-route metric received from the relay node.

12. The apparatus of claim 7, wherein the multi-route metric is determined by a second route metric with regard to the relay node, a second relay node, and the target node, and a second traffic load rate with regard to a routing path from the relay node to the target node through the second relay node, the second metric being an average amount of resources used for a plurality of routing paths from the relay node to the target node through the second relay node.

13. The apparatus of claim 7, wherein the plurality of nodes comprises at least one of a base station, a relay station, a multi-hop station, and a mobile station.

14. The apparatus of claim 7, wherein the RRM/scheduling block adds at least one node to form another path, when the amount of resources used for a first path increases.

15. The apparatus of claim 7, wherein the RRM/scheduling block removes at least one node included in a path, when the amount of resources used for a first path increases.

* * * * *